Figure 1:
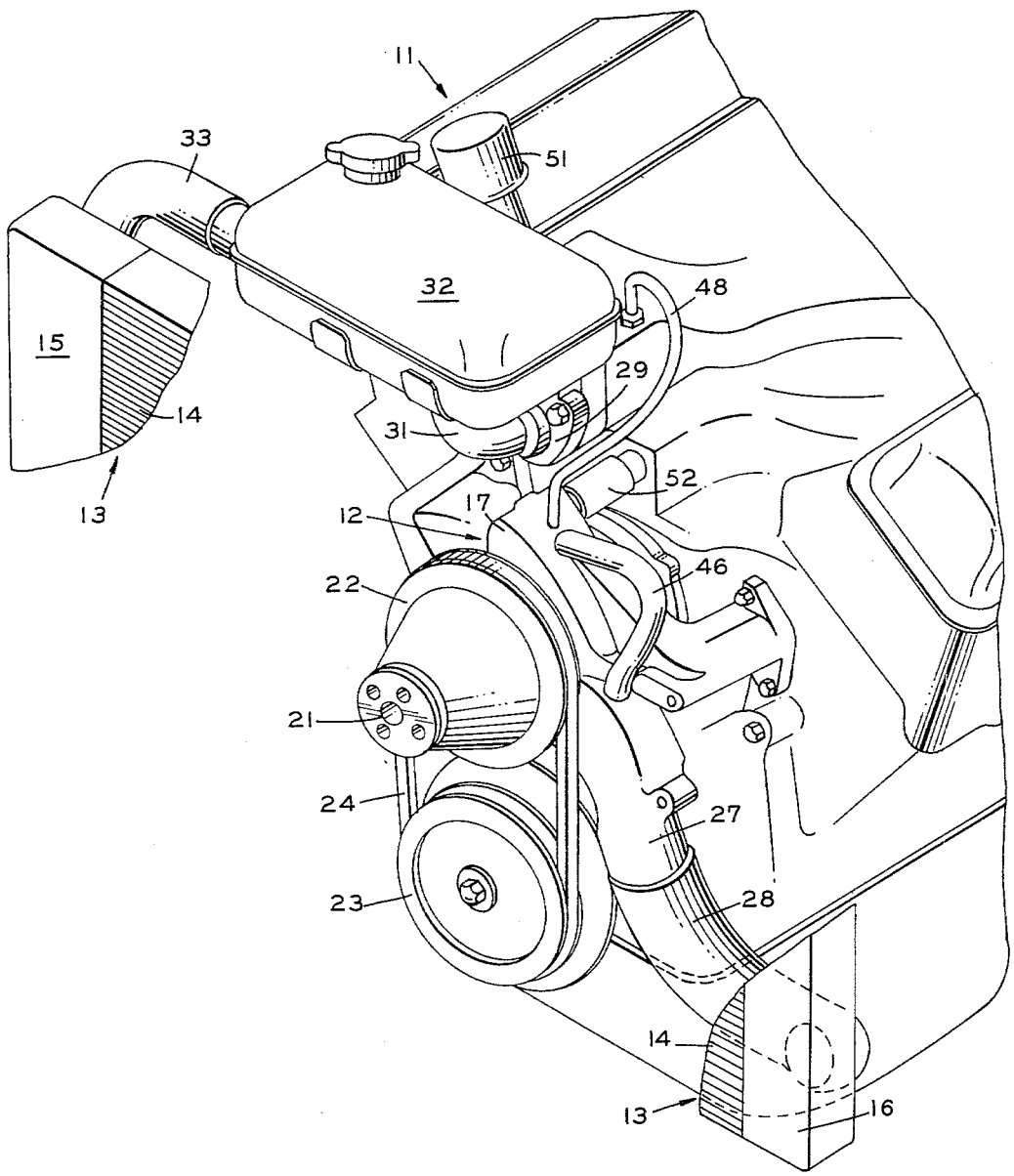

Jan. 11, 1966  J. P. STEFAN  3,228,381
TEMPERATURE SENSITIVE DEVICE
Filed Nov. 13 1964  2 Sheets-Sheet 1

JOHN P. STEFAN
INVENTOR

BY John R. Faulkner
Ernest A. Beutler
ATTORNEYS

Jan. 11, 1966  J. P. STEFAN  3,228,381
TEMPERATURE SENSITIVE DEVICE
Filed Nov. 13 1964  2 Sheets-Sheet 2
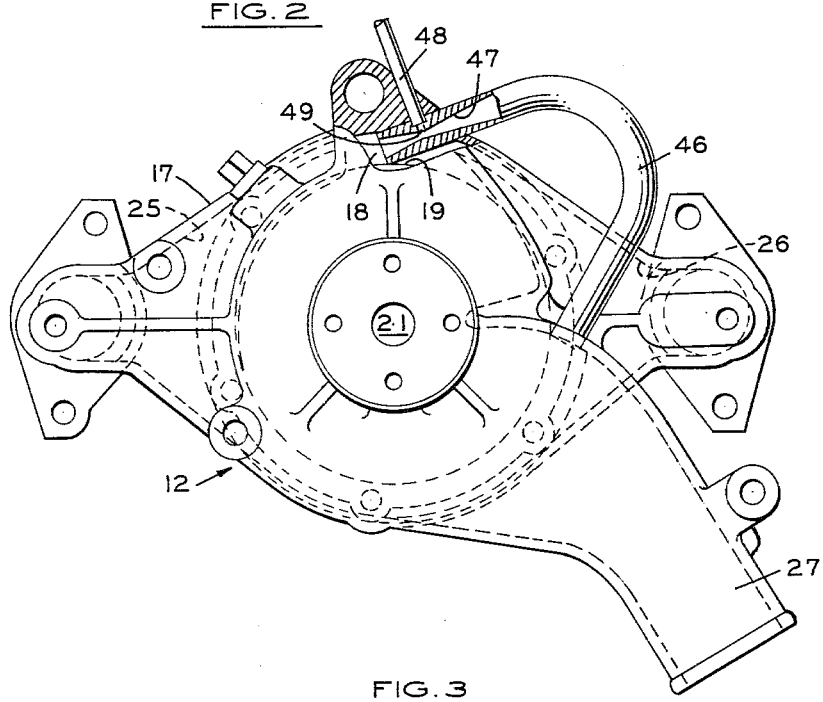
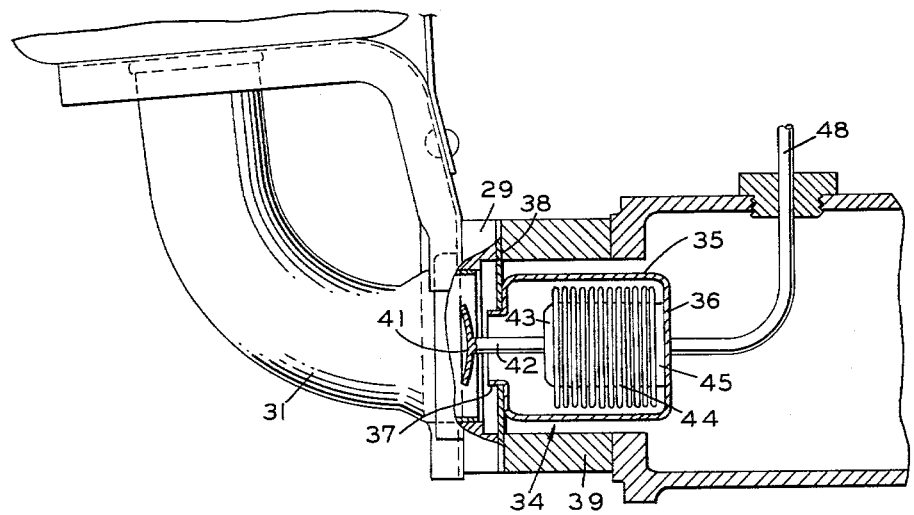
JOHN P. STEFAN
INVENTOR
BY John R. Faulkner
Ernest A. Beutler
ATTORNEYS

United States Patent Office 3,228,381
Patented Jan. 11, 1966

3,228,381
TEMPERATURE SENSITIVE DEVICE
John P. Stefan, Birmingham, Mich., assignor to Ford Motor Company, Dearborn, Mich., a corporation of Delaware
Filed Nov. 13, 1964, Ser. No. 410,937
25 Claims. (Cl. 123—41.08)

This invention relates to a temperature sensitive device and more particularly to a thermally responsive valve for a heat exchanging system that is particularly adapted for use in a liquid cooled internal combustion engine.

Devices that are responsive to or actuated by temperature variations are well known. It is well known, for example, to thermally actuate valves, switches, clutches and many other types of devices. Heretofore some form of actuating member having thermally responsive properties such as bimetallic springs and the like have been used for actuating these devices. In many instances it is undesirable, however, to provide an actuating element that has properties that are directly related to temperature variations.

It is an object of this invention to provide a thermally responsive device that does not depend directly upon an element having thermally responsive properties.

The conventional internal combustion engine has a radiator for dissipating the heat generated by the operation of the engine. The flow of a liquid coolant through the radiator is regulated by a thermostat that is responsive to the coolant temperature. The thermostats that are commonly employed have some form of temperature responsive element such as a wax pellet for actuating the valve. In some instances the wax pellets may deteriorate with age. In addition, although it is most desirable to operate the engine at as high a temperature as practical, the operating temperature for the engine is limited by the coolant that is used. The well known coolants, ethylene, glycol, water and methyl alcohol, have widely differing boiling points. It heretofore has been common to use different temperature range thermostats depending upon the coolant which is used to maintain an operating temperature below the boiling point of the coolant. The boiling point of any coolant also varies with the degree of pressurization of the cooling system. It has been the recent practice to employ higher pressures with the cooling system to permit an increase in the engine operating temperature. When increased pressures are used, it is necessary to employ a thermostat that maintains a higher cooling system temperature.

It is a further object of this invention to provide a thermostat for the cooling system of an internal combustion engine that is self-compensating for variations in coolant boiling point and cooling system pressure changes.

Another disadvantage to the use of a thermally responsive element is that it must directly experience the temperature variations. In the case of an internal combustion engine cooling system, this means that coolant must circulate past the thermostat at all times. It therefore has been the common practice to provide a small bleed passage in the valve member of the thermostat so that coolant will be circulated past its temperature responsive element even when the engine is cold. The bleed hole is additionally required to provide air relief during topping up of the cooling system. The bypass coolant flow can significantly increase warm up time since a portion of the coolant is continually being circulated through the radiator.

It is a further object of this invention to provide a thermostatic valve for an engine cooling system which may be fully closed when the engine is not at its operating temperature.

It is a still further object of this invention to provide an element that is thermally responsive even though it does not experience temperature variations directly.

This invention may be utilized to actuate a component in response to temperature variations by providing a venturi section and a means for circulating a fluid through the venturi section. The fluid circulated is adapted to vaporize at the throat of the venturi section at a predetermined temperature. Means are provided to generate a signal when the fluid vaporizes within the throat. Additional means are provided for rendering the component responsive to the signal of the previous mentioned means.

This invention may be practiced in conjunction with a cooling system of an internal combustion engine wherein the actuated device is a valve that controls the flow of liquid coolant through a radiator. The venturi section may be provided in one of the coolant passages of the engine. The valve can be actuated in response to variations in the pressure at the throat of the venturi sections since the pressure at the throat will decrease significantly when the temperature of the coolant causes vaporization at the throat.

Further objects and advantages of this invention will become more apparent as this description proceeds, particularly when considered in conjunction with the accompanying drawings, wherein:

FIGURE 1 is a perspective view with portions broken away of a liquid cooled internal combustion engine embodying this invention, FIGURE 2 is a front plan view, with portions shown in section, of the coolant pump of the engine shown in FIGURE 1, FIGURE 3 is a cross-sectional view showing a thermostatic valve employed in the cooling system shown in FIGURE 1.

Referring now in detail to the drawings and in particular to FIGURE 1, a liquid cooled internal combustion engine is indicated generally by the reference numeral 11. The cylinder block and cylinder heads of the engine 11 are provided with a cooling jacket through which a liquid coolant is circulated by means of a coolant pump, indicated generally by the reference numeral 12. The actual construction of the cooling jacket per se does not form a part of this invention and will not be described in detail. The heat generated by the operation of the engine is dissipated from a cross flow radiator, indicated generally by the reference numeral 13. The radiator 13 has a core 14 and header tanks 15 and 16 positioned at each side of the core.

The coolant pump 12 comprises a cast housing 17 that is supported at the front of the engine 11. The housing 17 forms a pumping chamber 18 in which a centrifugal impeller 19 is supported. The impeller 19 is journaled within the housing 17 upon a pump drive shaft 21. A pulley 22, affixed to the drive shaft 21, is driven from a pulley 23 that is affixed to the engine crankshaft by a belt 24. The pump 12 discharges into the cooling jacket of the engine through a pair of discharge passages 25 and 26 formed integrally with the housing 17 at each side thereof. The coolant is drawn into the cavity 18 through a coolant inlet fitting 27 which receives coolant from the lower side of the header tank 16 via a flexible hose 28.

After the coolant has circulated through the cooling jacket of the engine 11, it is discharged from a coolant discharge fitting 29 positioned at the front of the engine. A flexible hose 31 extends from the discharge fitting 29 to the lower side of an expansion tank 32 that is positioned between the radiator 13 and the engine 11. The expansion tank 32 is connected to the upper side of the radiator header tank 15 by a flexible hose 33 so that the coolant, which has been heated by the engine's operation, may dissipate its heat to the atmosphere.

A valve (FIGURE 3) is provided at the mouth of the coolant discharge fitting 29 to control the flow of coolant through the radiator 13. The valve, which is indicated generally by the reference numeral 34, comprises a generally cylindrical sheet metal member 35 having an integral lower end 36. Longitudinal slots (not shown) are formed around the periphery of the cylindrical member 35 so that coolant may flow through it. The upper end of the cylindrical member 35 terminates in a reduced diameter neck portion 37 that is affixed to an annular plate 38. The plate 38 is, in turn, clamped between the coolant discharge fitting 29 and an annular projection 39 that forms the coolant discharge for the engine.

A valve member 41 is supported by an actuating rod 42 for reciprocation into and out of engagement with the neck portion 37 to control the flow of coolant through the neck portion 37 to the radiation 13. The lower end of the actuating rod 42 is connected to a substantially rigid wall 43 formed at one end of a resilient, sealed bellows 44. A lower wall 45 of the bellows 44 is affixed to the lower end 36 of the cylindrical member 35.

In the conventional cooling system, the valve member 41 would be positioned by some form of thermally responsive element. This necessitates a flow of coolant past the element at all times so that it may accurately sense the temperature of the engine coolant. To accomplish this the valve member 41 is normally provided with some form of bypass passage so that a small amount of coolant is always circulated through the radiator 13. This bypass passage also permits air to be purged from the system when it is being filled. Because the bypass passage permits the flow of coolant through the radiator 13 at all times, it tends to increase the warm up time of the engine.

In the embodiment disclosed, the valve member 41 permits absolutely no fluid flow through the radiator 13 when it is in its closed position against the neck 37. If desired, some form of resilient seal may be provided between the valve member 41 and the neck 37 to insure against fluid flow when the valve 34 is closed.

The valve member 41 is rendered responsive to the coolant temperature in the manner now to be described. A bypass conduit 46 is provided in the cooling pump (FIGURE 2) 12. The bypass conduit 46 extends from the outlet side of the pump 12 to the inlet fitting 27 so that coolant will always be circulated through it. A venturi section 47 is positioned at the inlet end of the bypass conduit 46. The mouth of the venturi section is disposed tangentially to the periphery of the impeller 19. A conduit 48 connects the interior of the bellows 44 with the venturi section 47 at its throat 49.

Operation

When the engine 11 is not operating, the resilience of the bellows 44 urges the valve actuating rod 42 and the valve member 41 axially away from engagement with the neck portion 37. Thus, when the engine is not running, the valve member 41 is open and air may escape from the cooling jacket of the engine, particularly when it is being filled with coolant.

As soon as the engine 11 starts to operate and the coolant pump impeller 19 rotates, coolant will flow through the bypass conduit 46 and its venturi section 47. The flow through the venturi throat 49 causes a decreased static pressure that is transmitted through the conduit 48 to the interior of the bellows 44. The resilience of the bellows 44, the coolant pressure acting on the valve member 41 and the normal pressure at the throat 49 are so selected that the decreased pressure within the bellows 44 overcomes the tendency of the valve member 41 to open. The valve member 41 will then engage the neck 37 and preclude the flow of coolant through the radiator 13.

As the temperature of the coolant rises due to operation of the engine, it will eventually reach a point at which the decreased pressure at the throat of the venturi section 49 causes the fluid to flash or become a vapor. When this occurs an increase in the absolute pressure of decrease in vacuum will be transmitted through the conduit 48 to the interior of the bellows 44. The decreased vacuum is insufficient to overcome the water pressure acting on the valve member 41 and the resilience of the bellows 44 and the valve member 41 will move away from the neck 37 to permit coolant to flow through the radiator 13. The coolant flow through the radiator 13 will continue until the temperature of the coolant drops sufficiently that it will not vaporize at the venturi section throat 49. When the coolant flowing through the throat 49 of the venturi section 47 again returns to the fluid state, the valve member 41 will close.

The components of the system may be designed so that the temperature at which the coolant vaporizes in the venturi throat 49 is the desired engine operating temperature. As has been noted, it is desirable to operate the engine at as high a temperature as possible to improve its efficiency. The actual operating temperature is limited, however, by the boiling point of the coolant. Coolants having a methyl alcohol base have a much lower boiling point than does water. Ethylene glycol, however, has a higher boiling point than water. It has been the practice to embody thermostatic valves that open at a temperature that depends upon the coolant which is used. It should be readily apparent, however, that the disclosed system will be self-compensating for variations in the coolant boiling point. Coolants having lower boiling points will vaporize at lower temperatures in the venturi throat 49 to cause the valve member 41 to open at a lower temperature. In a like manner, coolants having higher boiling points will cause a delay in the opening of the valve member 41.

It has also been common to pressurize the cooling system through the use of a pressure relief filler cap, as identified by the reference numeral 51, to raise the boiling point of the coolant. The increase in boiling point resulting from the pressurization of the system can only be utilized if the thermostat is changed in the conventional cooling system. Again, the disclosed cooling system is self-compensating for variations in cooling system pressure since the point at which the coolant vaporizes in the venturi throat 49 also will depend upon the system pressure.

It is to be understood that the system disclosed is exemplary of a preferred embodiment of the invention. This invention may be practiced with other types of cooling system or heat exchanging systems than that disclosed. The venturi section also may be positioned at any point in the path of coolant flow. For example, the venturi section could be positioned in a bypass conduit 52 (FIGURE 1) that extends between the engine cooling jacket and the inlet side of the coolant pump 12. Such bypass conduits are conventionally provided so that coolant may be circulated through the engine by the coolant pump when the thermostatic valve is closed. It, also, is to be understood that the disclosed structure for sensing temperature variations may be used in other systems that require the operation of a temperature sensitive element. Various other changes and modifications may be made without departing from the spirit and scope of the invention, as defined by the appended claims.

I claim:

1. A system comprising a system component adapted to be actuated in response to temperature variations and means for actuating said component comprising a venturi section, means for circulating a fluid through said venturi section, the fluid being adapted to vaporize at the throat of said venturi section at a predetermined temperature, means for generating a signal when the fluid vaporizes within said throat, and means for rendering said component responsive to the signal of said last-named means.

2. A system comprising a system component adapted to be actuated in response to temperature variations and a means for actuating said component comprising a venturi section, means for circulating a fluid through said venturi section, the fluid being adapted to vaporize at the throat of said venturi section at a predetermined temperature, means for sensing the pressure at said throat for generating a signal when the fluid vaporizes within said throat, and pressure responsive means for actuating said component in response to the signal of said last-named means.

3. A heat exchanging system comprising a system component adapted to be activated in response to temperature variations, a heat exchanger, a pump for circulating a fluid, conduit means interconnecting said pump and said heat exchanger, a venturi section formed in a portion of said conduit means, the fluid circulated by said pump being adapted to vaporize at the throat of said venturi section at a predetermined temperature, means for generating a signal when the fluid vaporizes within said throat, and means for rendering said component responsive to the signal of said last-named means.

4. A heat exchanging system comprising a system component adapted to be actuated in response to temperature variations, a heat exchanger, a fluid pump for circulating a fluid, conduit means connecting said fluid pump and said heat exchanger, a venturi section formed in a portion of said conduit means, the fluid being adapted to vaporize at the throat of said venturi section at a predetermined temperature, means for sensing the pressure differential caused at said throat by the fluid vaporization, and pressure responsive means for actuating said component in response to the sensing of a pressure variation by said last-named means.

5. A cooling system for a liquid cooled internal combustion engine comprising a cooling jacket for said engine, a coolant pump for circulating liquid coolant, a radiator for dissipating the heat generated by said engine, conduit means interconnecting said coolant pump, said cooling jacket and said radiator, a venturi section positioned in a portion of said conduit means, the liquid coolant flowing through said venturi section being adapted to vaporize at the throat of said venturi section at a predetermined coolant temperature, means for generating a signal when the liquid coolant vaporizes within said throat, and means for actuating a cooling system component in response to the signal of said last-named means.

6. A cooling system for a liquid cooled internal combustion engine comprising a cooling jacket for said engine, a coolant pump for circulating liquid coolant, a radiator for dissipating the heat generated by said engine, conduit means interconnecting said coolant pump, said cooling jacket and said radiator, a venturi section positioned in a portion of said conduit means, the liquid coolant flowing through said venturi section being adapted to vaporize in the throat of said venturi section at a predetermined coolant temperature, means for sensing the pressure differential at said throat when the liquid coolant vaporizes, and pressure responsive means responsive to the signal of said last-named means for actuating a cooling system component.

7. A heat exchanging system comprising a heat exchanger, a pump for circulating a fluid, conduit means interconnecting said pump and said heat exchanger, valve means positioned in said conduit means for controlling the flow of fluid between said pump and said heat exchanger, a venturi section formed in a portion of said conduit means, the fluid circulated by said pump through said venturi section being adapted to vaporize at the throat of said venturi section at a predetermined temperature, means for generating a signal when the fluid vaporizes within said throat, and means for actuating said valve means in response to the generation of a signal by said last-named means.

8. A heat exchanging system comprising a heat exchanger, a pump for circulating a fluid, conduit means interconnecting said pump and said heat exchanger, valve means for controlling the flow of fluid between said pump and said heat exchanger, a bypass conduit interconnecting the inlet and outlet sides of said pump independent of said heat exchanger, a venturi section formed in said bypass conduit, the fluid circulated by said pump through said bypass conduit being adapted to vaporize at the throat of said venturi section at a predetermined temperature, means for generating a signal when the fluid vaporizes within said throat, and means for actuating said valve means in response to the generation of a signal by said last-named means.

9. A heat exchanging system comprising a heat exchanger, a pump for circulating a fluid, conduit means interconnecting said pump and said heat exchanger, valve means for controlling the flow of fluid between said pump and said heat exchanger, a bypass conduit interconnecting the inlet and the outlet sides of said pump independent of said heat exchanger, a venturi section formed in said bypass conduit, the fluid circulated by said pump through said bypass conduit being adapted to vaporize at the throat of said venturi section at a predetermined temperature, means for sensing the pressure differential caused at said throat by the fluid vaporization, and pressure responsive means operatively connected to said valve means for actuating said valve means in response to the sensing of a pressure variation by said last-named means.

10. A cooling system for a liquid cooled internal combustion engine comprising a cooling jacket for said engine, a coolant pump for circulating liquid coolant, a radiator for dissipating the heat generated by said engine, conduit means interconnecting said coolant pump, said cooling jacket and said radiator, valve means for controlling the flow of liquid coolant through said radiator, a venturi section positioned in a portion of said conduit means, the liquid coolant flowing through said venturi section being adapted to vaporize at the throat of said venturi section at a predetermined coolant temperature, means for generating a signal when the liquid coolant vaporizes within said throat, and means for moving said valve means from its closed to its opened position in response to the signal of said last-named means.

11. A cooling system for a liquid cooled internal combustion engine comprising a cooling jacket for said engine, a coolant pump for circulating a liquid coolant, a radiator for dissipating the heat generated by said engine, conduit means interconnecting said coolant pump, said cooling jacket and said radiator, valve means for controlling the flow of coolant through said radiator, a bypass conduit interconnecting the inlet and outlet sides of said coolant pump independent of said radiator, a venturi section formed in said bypass conduit, the liquid coolant flowing through said venturi section being adapted to vaporize at the throat of said venturi section at a predetermined coolant temperature, means for generating a signal when the liquid coolant vaporizes within said throat, and means for moving said valve means from its closed to its opened position in response to the signal of said last-named means.

12. A cooling system for a liquid cooled internal combustion engine comprising a cooling jacket for said engine, a coolant pump for circulating a liquid coolant, a radiator for dissipating the heat generated by said engine, conduit means interconnecting said coolant pump, said cooling jacket and said radiator, valve means for controlling the flow of coolant through said radiator, a bypass conduit interconnecting the inlet and outlet sides of said coolant pump independent of said radiator, a venturi section formed in said bypass conduit, the liquid coolant flowing through said venturi section being adapted to vaporize at the throat of said venturi section at a predetermined coolant temperature, means for sensing the pressure variation at said throat when the liquid coolant vaporizes, and pressure responsive means operatively connected to said valve means for actuating said valve means in response to the sensing of a pressure variation by said last-named means.

13. A heat exchanging system comprising a pump for circulating a fluid, conduit means including a venturi section for receiving the fluid circulated by said pump, an actuating member operatively connected to a component of said system for actuating said component, biasing means urging said actuating member in a first direction, fluid pressure means opposing the action of said biasing means, and conduit means interconnecting said fluid pressure means with said venturi section at its throat for transmitting the pressure at said throat to said fluid pressure means, the fluid flowing through said venturi section being adapted to vaporize at a predetermined temperature for decreasing the force exerted by said fluid pressure means whereby said biasing means may urge said actuating member in said first direction.

14. A heat exchanging system comprising a heat exchanger, a pump for circulating a fluid, conduit means interconnecting said pump and said heat exchanger, a venturi section positioned in said conduit means for receiving at least a portion of the fluid circulated by said pump, valve means for controlling the flow of fluid through said heat exchanger, an actuating member operatively connected to said valve means for moving said valve means between an opened and a closed position, biasing means for urging said actuating member in a first direction, fluid pressure means for opposing the action of said biasing means, and conduit means interconnecting said fluid pressure means with said venturi section at its throat for transmitting the pressure at said throat to said fluid pressure means, the fluid flowing through said venturi section being adapted to vaporize at a predetermined temperature for decreasing the force exerted by said fluid pressure means whereby said biasing means may urge said actuating member in said first direction.

15. A cooling system for a liquid cooled internal combustion engine comprising, a cooling jacket for said engine, a coolant pump for circulating a liquid coolant, a radiator for dissipating the heat generated by said engine, conduit means interconnecting said coolant pump, said cooling jacket and said radiator, valve means for controlling the flow of coolant through said radiator, a venturi section positioned in a portion of said conduit means, the liquid coolant flowing through said venturi section being adapted to vaporize in the throat of said venturi section at a predetermined coolant temperature, an actuating member operatively connected to said valve means for moving said valve means between an opened and a closed position, biasing means urging said actuating member in a direction for opening said valve means, fluid pressure means opposing the action of said biasing means, and conduit means interconnecting said fluid pressure means with said venturi section at its throat for transmitting the pressure at said throat to said fluid pressure means, the decreased pressure generated by the flow of liquid coolant through the throat of said venturi section being sufficient to cause said fluid pressure means to actuate said valve to its closed position, the vaporization of the coolant at said predetermined temperature in the throat of said venturi being effective to decrease the force exerted by said fluid pressure means whereby said biasing means may urge said valve means to its opened position.

16. A heat exchanging system comprising a system component adapted to be actuated in response to temperature variations, an expansible fluid tight chamber defined in part by a wall, means operatively connecting said wall to said component for actuating said component upon changes in the volume of said fluid tight chamber, a venturi section, means for circulating fluid through said venturi section, the fluid being adapted to vaporize at the throat of said venturi section at a predetermined temperature, and conduit means interconnecting the throat of said venturi section with said fluid tight chamber for varying the pressure within said chamber in response to pressure variations within said throat, said wall being resiliently biased in a first direction tending to enlarge said chamber, the decreased pressure within said chamber generated by the flow through said throat being sufficient to resist movement in said first direction when the fluid flowing through said throat is in the liquid state and insufficient to preclude movement in said first direction when the fluid flowing through said venturi section becomes a vapor at said throat.

17. A heat exchanging system comprising a heat exchanger, a pump for circulating a fluid, conduit means interconnecting said pump and said heat exchanger, a system component adapted to be actuated in response to temperature variations, an expansible fluid tight chamber defined in part by a wall, means operatively connecting said wall to said component for actuating said component upon changes in the volume of said fluid tight chamber, a venturi section in said conduit means, the fluid circulated in said system by said pump being adapted to vaporize at the throat of said venturi section at a predetermined temperature, and conduit means interconnecting the throat of said venturi section with said fluid tight chamber for varying the pressure within said chamber in response to pressure variations within said throat, said wall being resiliently biased in a first direction tending to enlarge said chamber, the decreased pressure within said chamber generated by the flow through said throat being sufficient to resist movement in said first direction when the fluid flowing through said throat is in the liquid state and insufficient to preclude movement in said first direction when the fluid flowing through said venturi section vaporizes at said throat.

18. A cooling system for a liquid cooled internal combustion engine comprising a cooling jacket for said engine, a coolant pump for circulating a liquid coolant, a radiator for dissipating the heat generated by said engine, conduit means interconnecting said coolant pump, said cooling jacket and said radiator, a system component adapted to be actuated in response to variations in the temperature of said coolant, an expansible fluid tight chamber defined in part by a wall, means operatively connecting said wall to said component for actuating said component upon changes in the volume of said fluid tight chamber, a venturi section in a portion of said conduit means, the liquid coolant being adapted to vaporize at the throat of said venturi section at a predetermined temperature, and conduit means interconnecting the throat of said venturi section with said fluid tight chamber for varying the pressure within said chamber in response to pressure variations within said throat, said wall being resiliently biased in a first direction tending to enlarge said chamber, the decreased pressure within said chamber generated by the flow through said throat being sufficient to resist movement in said first direction when the coolant flowing through said throat is in the liquid state and insufficient to preclude movement in said first direction when the coolant flowing through said venturi section becomes a vapor at said throat.

19. A heat exchanging system comprising a heat exchanger, a pump for circulating a fluid, conduit means interconnecting said pump and said heat exchanger, a valve for controlling the flow through said heat exchanger, an expansible fluid tight chamber defined in part by a wall, means operatively connecting said wall to said valve for actuating said valve upon changes in the volume of said fluid tight chamber, a venturi section in said conduit means adapted to experience fluid flow regardless of the flow through said heat exchanger, the fluid circulated in said system by said pump being adapted to vaporize at the throat of said venturi section at a predetermined temperature, and conduit means interconnecting the throat of said venturi with said fluid tight chamber for varying the pressure within said chamber in response to pressure variations within said throttle, said wall being resiliently biased in a first direction tending to enlarge said chamber and actuate said valve in a first direction, the decreased pressure within said chamber generated by the flow through said throat being sufficient to resist enlargement of said chamber and movement of said valve in said first direction when the fluid flowing through said throat is in the liquid state and being insufficient to preclude movement of said valve in said first direction when the fluid flowing through said venturi section vaporizes at said throat.

20. A cooling system for a liquid cooled internal combustion engine comprising a cooling jacket for said engine, a coolant pump for circulating liquid coolant, a radiator for dissipating the heat generated by said engine, conduit means interconnecting said coolant pump, said cooling jacket and said radiator, valve means for controlling the flow of fluid through said radiator, an expansible fluid tight chamber defined in part by a wall, means operatively connecting said wall to said valve means for actuating said valve means upon changes in the volume of said fluid tight chamber, a bypass conduit including a venturi section interconnecting the inlet and outlet sides of said pump, the liquid coolant being adapted to vaporize at the throat of said venturi section at a predetermined temperature, conduit means interconnecting the throat of said venturi section with said fluid tight chamber for varying the pressure within said chamber in response to pressure variations within said throat, said wall being resiliently biased in a direction tending to enlarge said chamber and move said valve means toward its opened position, the decreased pressure within said chamber generated by the flow through said throat being sufficient to resist opening of said valve means when the coolant flowing through said throat is in the liquid state and being insufficient to preclude opening of said valve means when the coolant flowing through said venturi section becomes a vapor at said throat.

21. A heat exchanging system comprising a system component adapted to be actuated in response to temperature variations, a resilient sealed bellows operatively connected to said component and urging said component in a first direction, a venturi section, means for circulating a fluid through said venturi section, the fluid being adapted to vaporize at the throat of said venturi section at a predetermined temperature, conduit means interconnecting said bellows with the throat of said venturi section for generating a pressure within said bellows, the decreased pressure within said bellows generated by the flow through said throat being sufficient to resist movement of said component in said first direction when the fluid flowing through said throat is in the liquid state and being insufficient to preclude movement in said first direction when the fluid flowing through said venturi section becomes a vapor at said throat.

22. A heat exchanging system comprising a heat exchanger, a pump for circulating a fluid, conduit means interconnecting said pump and said heat exchanger, a valve for controlling the flow of fluid through said heat exchanger, a resilient bellows operatively connected to said valve for actuating said valve, said bellows being normally biased in a first direction, a venturi section formed in a portion of said conduit means, the fluid circulated by said pump being adapted to vaporize at the throat of said venturi section at a predetermined temperature, and conduit means interconnecting the throat of said venturi section with the interior of said bellows for varying the pressure within said bellows in response to pressure variations within said throat, the decreased pressure within said bellows generated by the flow through said throat being sufficient to resist movement in said first direction when the fluid flowing through said throat is in the liquid state and being insufficient to preclude movement in said first direction when the fluid flowing through said venturi section becomes a vapor at said throat.

23. A cooling system for a liquid cooled internal combustion engine comprising a cooling jacket for said engine, a coolant pump for circulating liquid coolant, a radiator for dissipating the heat generated by said engine, conduit means interconnecting said coolant pump, said cooling jacket and said radiator, a valve for controlling the flow of coolant through said radiator, a fluid tight resilient bellows operatively connected to said valve for moving said valve between its open and its closed positions, the resilience of said bellows being effective to urge said valve toward its opened position, a bypass conduit including a venturi section interconnecting the inlet and outlet sides of said pump, the liquid coolant being adapted to vaporize at the throat of said venturi section at a predetermined temperature, and conduit means interconnecting the throat of said venturi section with the interior of said bellows for varying the pressure within said bellows in response to pressure variations within said throat, the decreased pressure within said bellows generated by the flow through said throat being sufficient to overcome the resilience of said bellows and actuate said valve toward its closed position when the coolant flowing through said throat is in the liquid state and being insufficient to resist opening of said valve when the coolant flowing through said venturi section becomes a vapor at said throat.

24. A heat exchanging system comprising a heat exchanger, a pump for circulating a fluid, conduit means interconnecting said pump and said heat exchanger, valve means for controlling the flow of fluid through said heat exchanger, means for opening said valve means when said pump is not operative and for actuating said valve means between its opened and closed positions in response to temperature variations in said fluid when said pump is operating.

25. A cooling system for a liquid cooled internal combustion engine comprising a cooling jacket for said engine, a coolant pump for circulating a liquid coolant, a radiator for dissipating the heat generated by said engine, conduit means interconnecting said coolant pump, said cooling jacket and said radiator, valve means for controlling the flow of coolant through said radiator, and means for moving said valve means to its open position when the engine is not operating and for moving said valve means between its open and closed positions in response to variations in the temperature of the coolant when the engine is operating.

References Cited by the Examiner
UNITED STATES PATENTS

| | | | |
|---|---|---|---|
| 1,403,493 | 1/1922 | Furber | 123—41.08 X |
| 2,011,876 | 8/1935 | Saunders | 123—41.08 |

KARL J. ALBRECHT, *Primary Examiner.*